No. 827,055. PATENTED JULY 24, 1906.
P. BRUNO.
PUNCH FOR OPERATING SEAL LOCKS.
APPLICATION FILED DEC. 2, 1905.
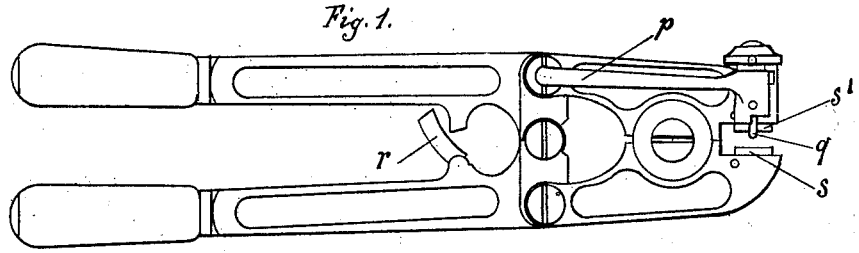
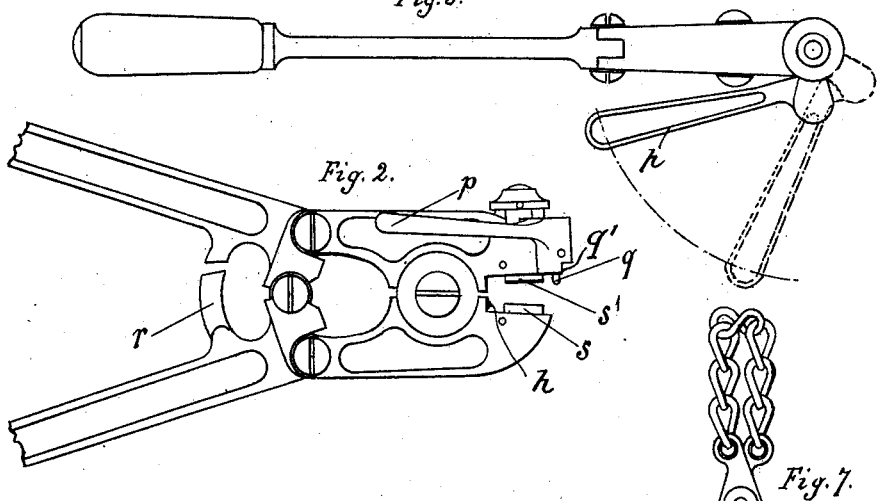
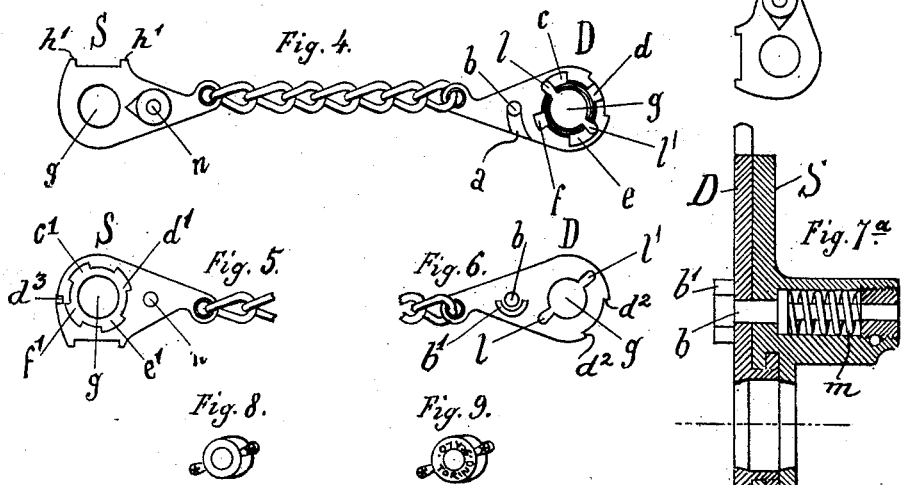
Witnesses.
Inventor.
Pietro Bruno
by his Attorney

UNITED STATES PATENT OFFICE.

PIETRO BRUNO, OF TURIN, ITALY.

PUNCH FOR OPERATING SEAL-LOCKS.

No. 827,055.      Specification of Letters Patent.      Patented July 24, 1906.

Original application filed December 3, 1904, Serial No. 235,311. Divided and this application filed December 2, 1905. Serial No. 290,016.

*To all whom it may concern:*

Be it known that I, PIETRO BRUNO, a subject of the King of Italy, residing at Turin, Italy, have invented certain new and useful Improvements in Punches for Operating Seal-Locks, of which the following is a specification.

This invention relates to punches for operating apparatus for securing and sealing doors and the like—for instance, the doors of baggage-cars—by means of an attachment comprising two metallic parts connected with each other by means of a chain, the said metallic parts being of such construction that they can be fixed to each other by means of a leaden seal, with the aid of the improved punch, and that when the said parts have been fixed to each other the same punch or an exactly similar one must be used in order to separate them without destroying special marks on the leaden seal.

In the annexed drawings, Figure 1 is a side view of the punch by means of which the seal is formed, the punch being shown in its closed condition. Fig. 2 represents the said punch in its open position. Fig. 3 represents same in plan view. Fig. 4 represents the attachment or fastening means, and Figs. 5 and 6 are separate views of the two members of said attachment seen from the other side. Fig. 7 represents the attachment with its two members connected to each other. Fig. 7ª is a section thereof on a larger scale. Fig. 8 represents a leaden seal before its insertion into the attachment, and Fig. 9 represents the said seal after it has been acted on by the punch.

As shown in Fig. 4, the attachment, which is the subject of a separate application for patent, Serial No. 235,311, filed December 3, 1904, of which this application is a division, comprises the two members D and S, which are fastened to the ends of the chain by means of which the two parts to be held in connection with each other—for instance, a door and its frame—are connected or fastened together. Each of the members D and S is provided at its center with an aperture $g$ in the form of a truncated cone, the major diameters of the two apertures being at those sides of the said members which are to be brought into contact with each other. The major circumference of the hole in the member D is surrounded by teeth $c\ d\ e\ f$, the corresponding circumference in the member S being surrounded by recesses $c'\ d'\ e'\ f'$, into which the said teeth are adapted to engage in the manner of a bayonet-fastening. The member D, Fig. 4, is provided with a curved groove $a$, which terminates in a small hole $b$ for the reception of a pin $n$, projecting from the member S, the said pin being acted on by a helical spring arranged at $m$. The pin $n$ prevents the relative movement of the members S and D when they are connected together.

As shown in Figs. 4 and 6, two recesses $l$ and $l'$, diametrically opposite each other, are provided at the circumference of the aperture $g$ in the member D. These recesses $l$ and $l'$ receive the lugs, (shown upon the sides of the seal in Figs. 8 and 9,) which prevent the seal falling through the aperture $g$ when inserted, since the lugs rest upon the face of the member S.

The jaws of the punch (shown in Figs. 1 and 2) are indicated by $s$ and $s'$. Rearward of the jaws $s\ s'$ the punch is formed with shoulders $h$ to engage between the lugs $h'\ h'$ on the member S to prevent the latter from revolving when the seal is to be removed. When the seal is to be punched, the abutment $r$ is placed in the position shown in Fig. 1. In Fig. 2 the said abutment is shown in the position which it occupies when the members of the fastening are to be separated from each other, the lever $p$, Fig. 3, pivoted near the jaws of the punch and provided with the fixed pin $q$, being used for this purpose. The pin $q$ is intended to engage in the hole $b$, and on turning the lever $p$ the pin $q$ moves in an arc of a circle about the axis of the lever $p$, which coincides with that of the dies of the punch.

When the chain has been passed through suitable staples or the like, fixed to the parts to be fastened together, the members S and D are placed together in such a manner that the surface of the part S (shown in Fig. 5) is placed against the surface of the part D. (Shown in Fig. 4.) The teeth $c, d, e,$ and $f$ on member D thus enter the recesses $c', d', e',$ and $f'$ on member S, whereupon the two said members are rotated with regard to each other, and the teeth hook together. The pin $n$ slides in the groove $a$ until it reaches the hole $b$, into which it is pressed by the spring $m$. The members S and D are by this means connected with each other in such a manner that they cannot easily be separated, since in order to do so it is necessary to push the pin $n$ out of the hole $b$.

The seal, (shown in Fig. 8,) which is provided with two radial projections or lugs, is thereupon inserted through the member D into the apertures $g$, and considerable pressure is then exerted on the said seal by means of the jaws $s$ and $s'$ of the punch, the surfaces of the said jaws being provided with type adapted to impress on the seal the marks of reference or identification desired. When this has been done, it is impossible to separate the members S and D without injuring the impression on the seal, unless the punch is used for that purpose, and an injured seal cannot, of course, be replaced without the aid of the said punch. The apertures $g$ in the members S and D allow of ascertaining at any moment whether the seal is uninjured.

For separating the members S and D the jaws $s$ and $s'$ of the punch are placed in contact with the surfaces of the seal, the abutment $r$ being in the position shown in Fig. 2. The jaws of the punch are then pressed toward each other, the lever $p$ being placed in such a position that the pin $q$ thereon enters the hole $b$ and pushes the pin $n$ out of the latter. $b'$ is a projecting guard against which the shoulder $q'$ on the lever $p$ abuts, so as to take the strain of the lateral twisting movement off the pin $q$. The lever $p$ is then so operated that it causes the member D to rotate, member S being held stationary by the lugs $h'$ $h'$. The rotation of D is limited by the shoulders $d^2$ $d^2$ on member D and the lug $d^3$ on member S. The seal being held in position by the jaws $s$ and $s'$, the lugs fixed to the said seal are by this means sheared off. The members S and D can thereupon be separated from each other.

What I claim is—

A punch for operating lead-seal locks comprising in combination two jaws movable to and from one another, coaxial dies on said jaws respectively, an optionally operative abutment for limiting the closing movement of said jaws, a lever pivoted on one of said jaws upon an axis coinciding with that of the dies and a pin on said lever placed to move in a path concentric with the die for the purpose set forth.

In witness whereof I have signed this specification in the presence of two witnesses.

PIETRO BRUNO.

Witnesses:
GOTTARDO C. PIRONI,
SECONDO CORTA.